United States Patent
Piech et al.

(10) Patent No.: US 6,910,547 B1
(45) Date of Patent: Jun. 28, 2005

(54) MOUNTING ARRANGEMENT OF AN AUTOMOBILE DRIVE UNIT HAVING A COMBUSTION ENGINE AND A TRANSMISSION

(75) Inventors: Ferdinand Piech, Braunschweig (DE); Dietmar Lagies, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 10/088,838
(22) PCT Filed: Apr. 22, 1999
(86) PCT No.: PCT/EP99/02716
   § 371 (c)(1),
   (2), (4) Date: Mar. 21, 2002
(87) PCT Pub. No.: WO00/17003
   PCT Pub. Date: Mar. 30, 2000

(30) Foreign Application Priority Data

Sep. 21, 1998 (DE) .......................................... 198 43 258

(51) Int. Cl.⁷ .............................................. B60K 17/00
(52) U.S. Cl. ..................... 180/291; 180/374; 123/197.5
(58) Field of Search ................................ 180/291, 248, 180/374; 123/198 R, 197.5; B60K 5/02, 17/00

(56) References Cited

U.S. PATENT DOCUMENTS

| | | | |
|---|---|---|---|
| 2,915,133 A | 12/1959 | Kraus | |
| 3,052,313 A | 9/1962 | Hooven | |
| 4,865,350 A | 9/1989 | Yamamoto | |
| 5,014,812 A | 5/1991 | Kazama | |
| 5,094,203 A | * 3/1992 | Mezger | ................... 123/198 R |
| 5,205,373 A | * 4/1993 | Kadokura et al. | .......... 180/248 |

FOREIGN PATENT DOCUMENTS

| | | | |
|---|---|---|---|
| CH | 273 580 | 5/1951 | |
| DE | 499 549 | 6/1930 | |
| DE | 29 04 066 | 8/1980 | |
| DE | 2904066 A | * 8/1980 | ............ F16F/15/26 |
| DE | 32 09 901 | 10/1983 | |
| DE | 3209901 C | * 10/1983 | ............. F01L/1/02 |
| DE | 3837256 C | * 8/1989 | ............. F02F/7/00 |

(Continued)

OTHER PUBLICATIONS

Article entitled "Das Aluminium–Kurbelgehäuse der Audi–Vierzylindermotoren mit 1,6 und 1,8 I Hubraum" by Von Rondolf Arndt, et al., MTZ motortechnische–Zeitschrift 58 (1997) 10, pp. 600–606.

Article entitled "Der Porsche 4,5–I–Rennsportwagen Typ 917" by Mezger, pp. 313–321, ATZ 71 (1969).

Article from Auto Motor und Sport, entitled "Beaull á" dated Sep. 23, 1998, p. 14–17.

Article from Auto Motor und Sport Von Lup bis Rolls–Royce entitled "VW Neuheiten" dated Jul. 1, 1998, p. 18 & 19.

* cited by examiner

Primary Examiner—Christopher P. Ellis
Assistant Examiner—Kelly E Campbell
(74) Attorney, Agent, or Firm—Ostrolenk, Faber, Gerb & Soffen, LLP

(57) ABSTRACT

The invention aims at providing a compact mounting arrangement for an automobile drive unit consisting of a combustion engine and a transmission. According to the invention, the crankshaft of the combustion engine and an auxiliary shaft driven by said crankshaft extend in the longitudinal direction of the vehicle, the cylinders of the combustion engine are subdivided into at least two rows forming an angle in relation to each other, wherein one of said cylinder rows is disposed in a horizontal or substantially horizontal manner.

12 Claims, 5 Drawing Sheets

FOREIGN PATENT DOCUMENTS

| | | | |
|---|---|---|---|
| DE | 38 37 256 | 8/1989 | |
| DE | 39 20 638 | 12/1989 | |
| DE | 38 09 995 | 7/1990 | |
| DE | 41 07 286 | 9/1991 | |
| DE | 40 29 058 | 3/1992 | |
| DE | 4029058 A * | 3/1992 | ............ B60K/5/02 |
| EP | 047 818 | 3/1982 | |
| EP | 411 319 A2 | 2/1991 | |
| EP | 411319 A2 * | 2/1991 | ............ F02B/61/06 |
| EP | 481 123 | 4/1992 | |
| EP | 514 943 B1 | 11/1992 | |
| FR | 991 749 | 10/1951 | |
| FR | 1 520 767 | 4/1968 | |
| GB | 11827470 | 3/1970 | |
| JP | 4-244426 | 9/1992 | |

* cited by examiner

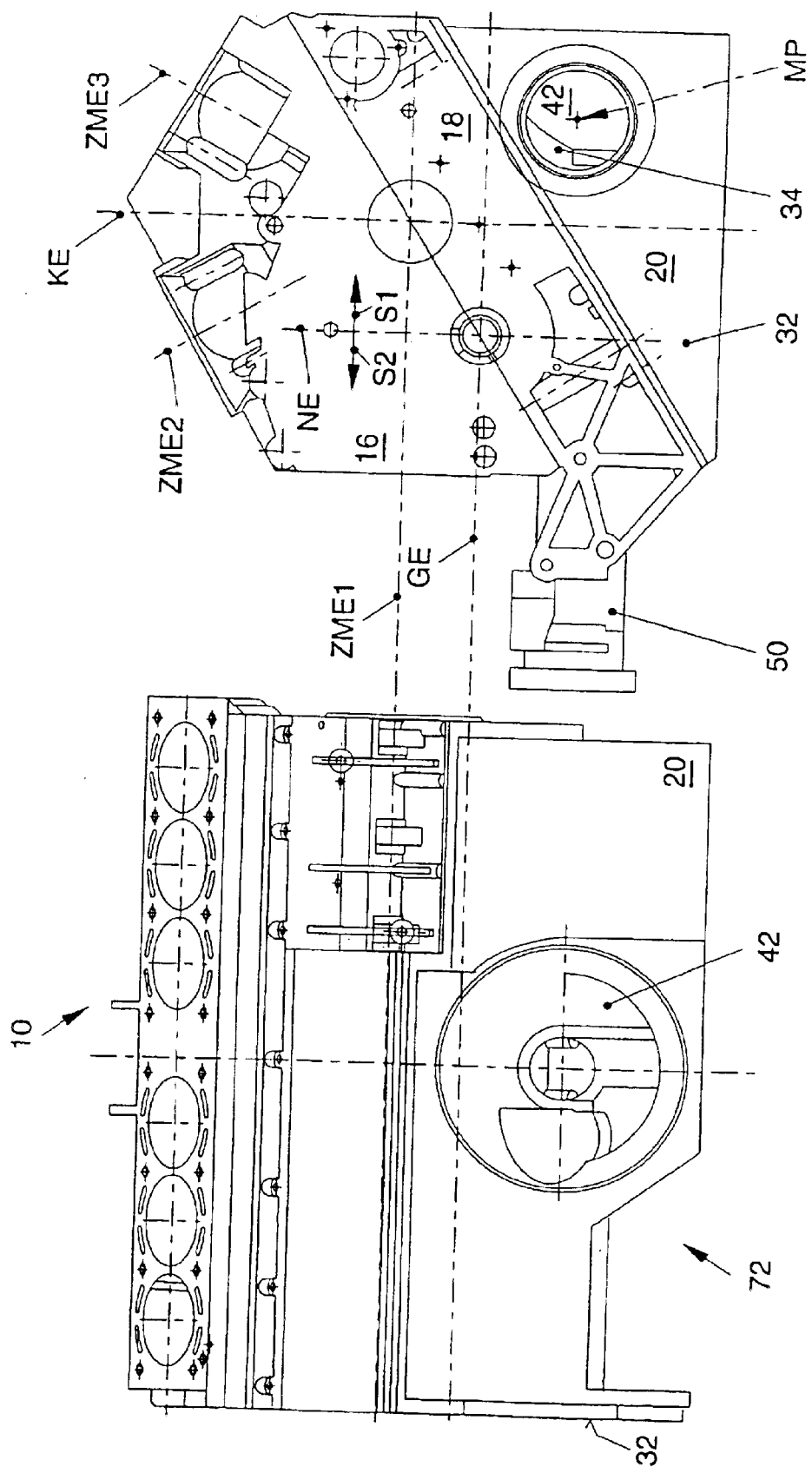

MOUNTING ARRANGEMENT OF AN AUTOMOBILE DRIVE UNIT HAVING A COMBUSTION ENGINE AND A TRANSMISSION

This is a U.S. national stage of application No. PCT/EP99/02716, filed on Apr. 22, 1999. Priority is claimed on that application and on the following application:
Country: Germany, Application No.: 198 43 258.5, filed Sep. 21, 1998.

BACKGROUND OF THE INVENTION

The invention relates to an installation arrangement for a drive unit which is intended for a vehicle and has an internal combustion engine and a transmission.

EP 0411319 A2, which represents the prior art in this field, discloses a motor vehicle having an inline internal combustion engine, having a crankshaft mounted in a housing of the internal combustion engine and having a parallel auxiliary shaft which is driven by this crankshaft and is used to transmit power to the transmission. The arrangement is in this case designed such that the internal combustion engine, which is in the form of a reciprocating piston internal combustion engine, is installed in the nose of the vehicle transversely between the driven front wheels and with one cylinder row inclined to the rear and with the auxiliary shaft, located in front of the internal combustion engine, being driven via a gear train arranged at the end of the internal combustion engine. This auxiliary shaft transmits the power directly from the internal combustion engine to a transmission, with a transmission output drive shaft that is located behind the internal combustion engine in the direction of travel driving the input drive shaft associated with the front wheels via a branch.

DE 39 206 38 C2 discloses a drive system for a motor vehicle having an inline internal combustion engine fitted in the longitudinal direction, in which a longitudinally fitted transmission is arranged behind the internal combustion engine in the direction of travel, is driven directly by the crankshaft, and whose output drive shaft, which runs at the side alongside the internal combustion engine, drives a branch, which is in the form of a differential, in a housing formed separately on an oil sump. An intermediate shaft which passes through the internal combustion engine oil sump runs between this differential and the vehicle wheel located on the other side of the internal combustion engine.

In order to reduce the installed height of this drive system, the cylinder row is fitted so that it is inclined to the right when seen in the direction of travel, so that the differential, when seen from above, is arranged lying underneath the cylinder row.

Finally, for an internal combustion engine having a V-shaped cylinder arrangement that is symmetrical with respect to a vertical plane and having a longitudinal crankshaft, it is known from EP 0514943 B1 for an arrangement which shortens the installation space of the drive unit comprising the internal combustion engine and the transmission, for the differential (which is driven by the output drive shaft of the transmission which is routed at the side alongside the internal combustion engine) to be arranged lying well forward in the direction of travel, at the side alongside the internal combustion engine.

SUMMARY OF THE INVENTION

The invention is based on the object of providing an installation arrangement of this generic type for a drive unit having an internal combustion engine and a transmission in a vehicle, which, with an arrangement that saves installation space, allows a comparatively large number of cylinders and allows a small vehicle overhang in front of the vehicle wheels.

Pursuant to this object, and others which will become apparent hereafter, one aspect of the present invention resides in an installation arrangement for a vehicle drive unit, which installation arrangement includes an internal combustion engine having cylinders arranged in at least two cylinder rows at an angle to one another. One of the cylinder rows is arranged to lie at least substantially horizontally. The installation arrangement further includes a transmission, an engine housing and a crankshaft mounted in the engine housing so as to lie in a longitudinal direction of the engine. A parallel auxiliary shaft is driven by the crankshaft for transmitting power to the transmission and an output drive shaft is in operative connection with the transmission for driving wheels of the vehicle.

In contrast to the prior art in this generic field, the invention provides for the crankshaft to be arranged such that it runs in the longitudinal direction of the vehicle, and for the cylinders of the internal combustion engine to be arranged in at least two cylinder rows that are at an angle to one another, with one of these cylinder rows being arranged horizontally or essentially horizontally. The term "at an angle" in this case means an angle of 90 degrees +/− 45 degrees, but not an angle in the order of magnitude of 180 degrees, as is used for Boxer internal combustion engines and their arrangement, which occupies a large amount of space, at least in width.

The output drive power from the crankshaft is not emitted directly from the crankshaft to the transmission, but via the auxiliary shaft to the transmission, which is generally arranged centrally in the vehicle, thus allowing the crankshaft to be moved to the side away from this vehicle center, which in turn enlarges the installation space on the opposite side, and this is filled by the horizontal cylinder row. The second cylinder row, which is arranged at an angle to this horizontal cylinder row, may be vertical, but can also be arranged such that it is swiveled laterally to one side or the other from the vehicle longitudinal center plane in order to reduce the installation height further.

In one preferred refinement, the installation space can be further optimized by arranging the auxiliary shaft to run in the vehicle center plane rather than the crankshaft, with a separation plane, which is provided in the housing of the internal combustion engine and bears the auxiliary shaft and the crankshaft, being positioned obliquely, that is to say being arranged inclined to a vertical.

Further advantages and features of the invention will become evident from the exemplary embodiment which is explained in more detail in the following text with reference to a drawing.

Where this disclosure refers to a lying or horizontal arrangement of the cylinder row, then this does not necessarily mean an exactly horizontally lying cylinder row and a minor deviation of the cylinder row position in both directions is, in fact, feasible without departing from the advantages according to the invention.

BRIEF DESCRIPTION OF THE DRAWINGS

In the figures.

FIG. 4: shows a view from the rear of the internal combustion engine only;

FIG. 5: shows a view from the right with respect to FIG. 4;

DETAILED DESCRIPTION OF THE PREFERRED EMBODIMENTS

Figure 1:
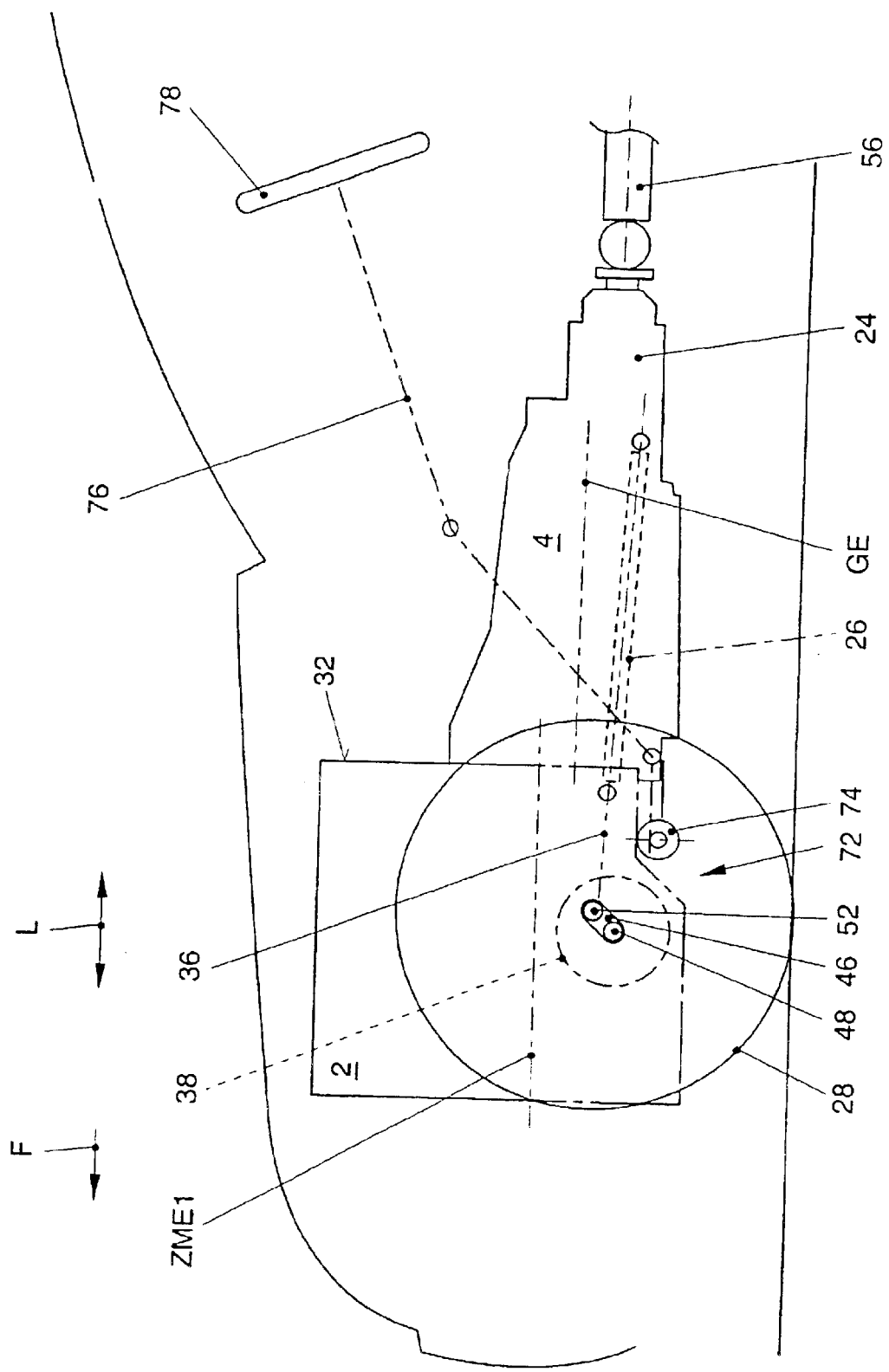
FIG. 1: shows a schematic side view of an installation arrangement.
Figure 2:
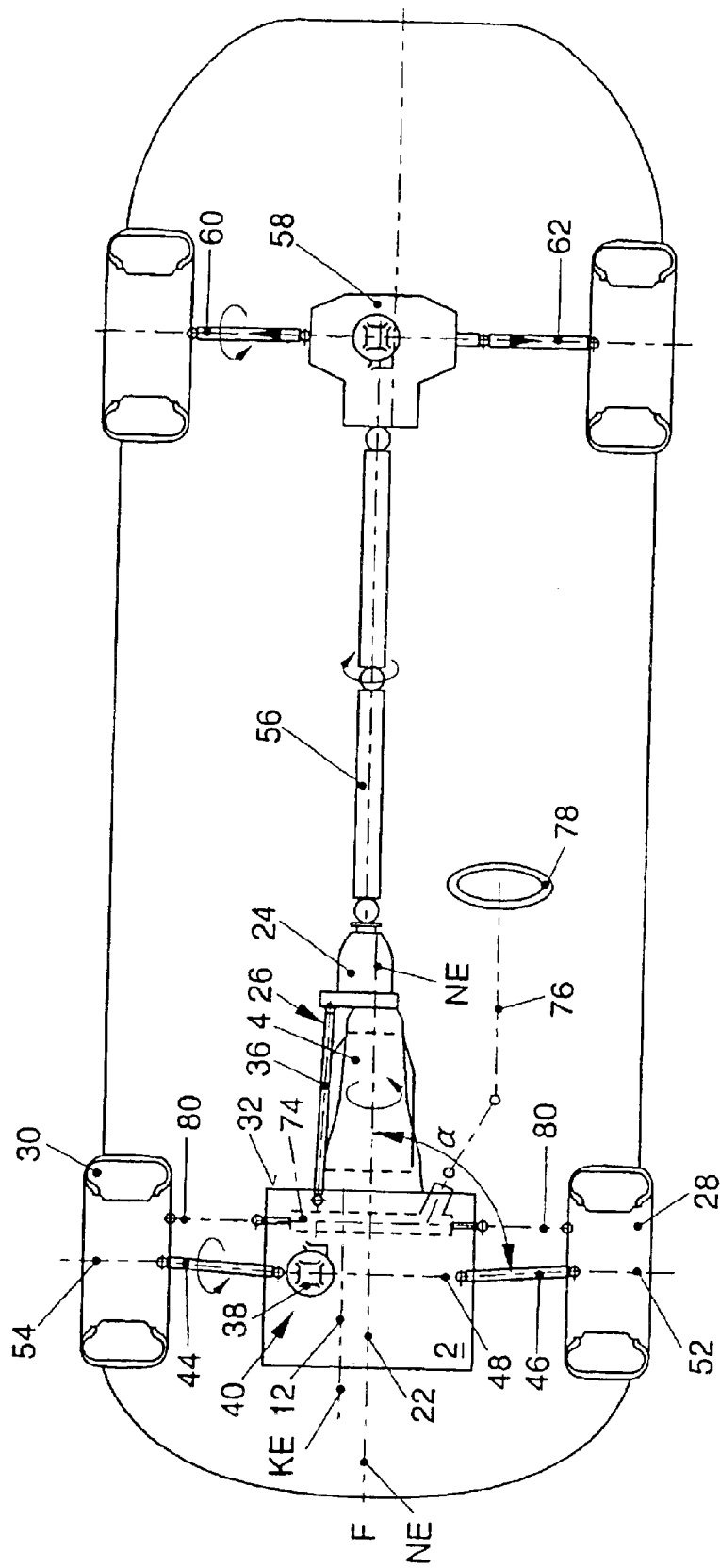
FIG. 2: shows a plan view thereof.
Figure 3:
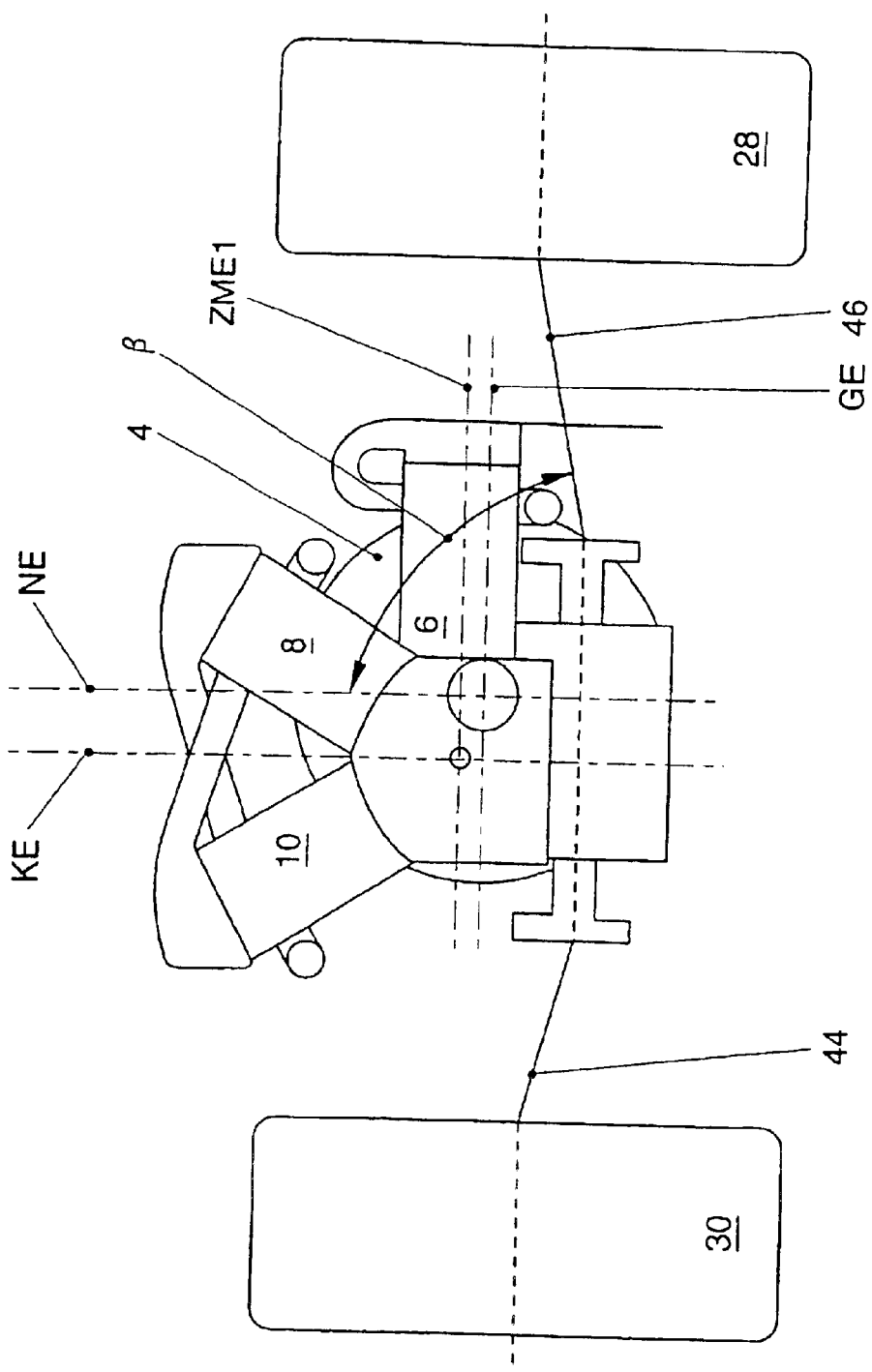
FIG. 3: shows a schematic view from the front.
Figures 6, 7:
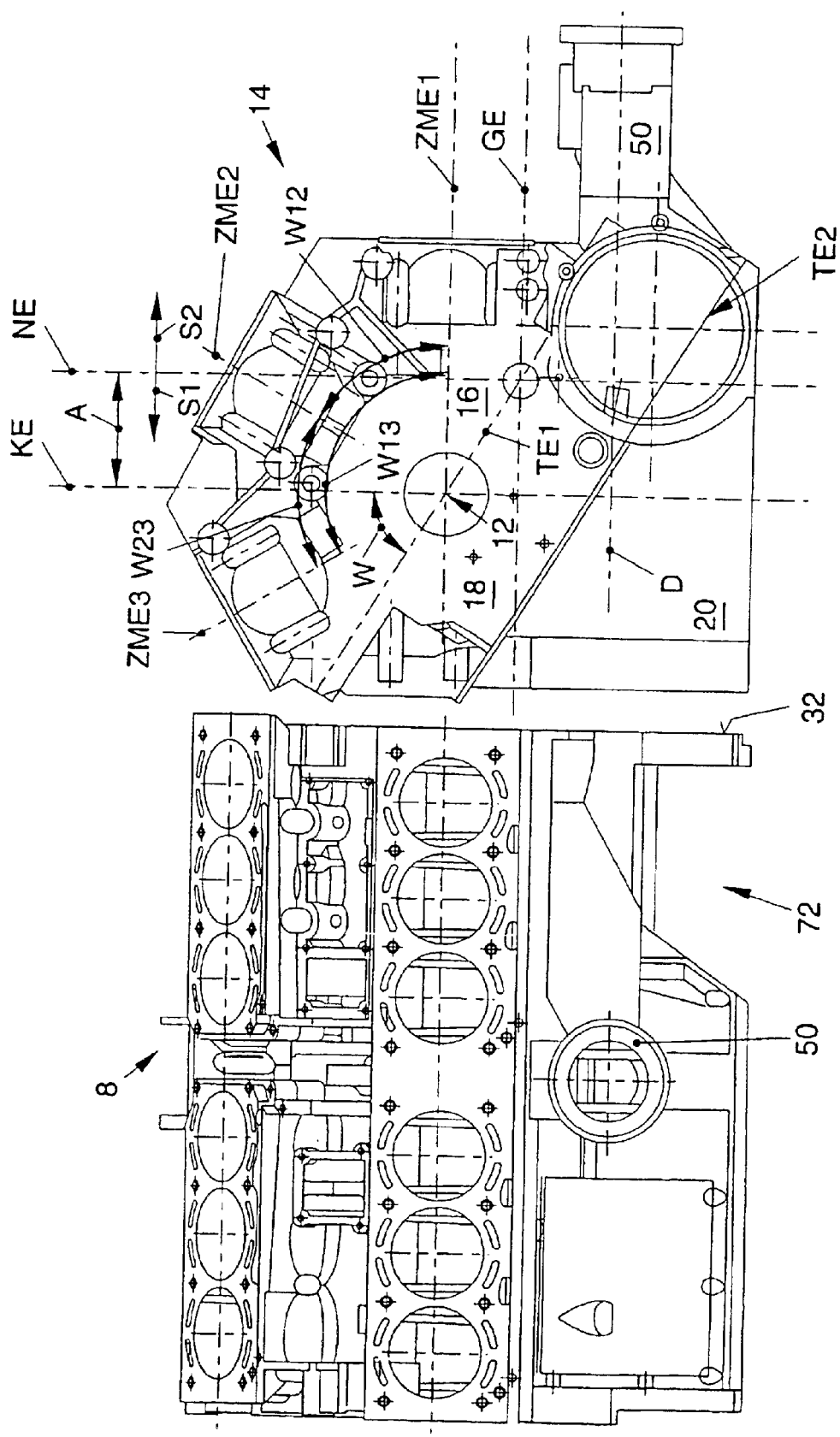
FIG. 6: shows a view from the front of the internal combustion engine only.
FIG. 7: shows a view from the right with respect to FIG. 6.

A vehicle, of which only the front vehicle area is illustrated schematically in FIG. 1, has a drive unit comprising an internal combustion engine 2 and a transmission 4. The drive unit is fitted in the longitudinal direction L of the vehicle, which corresponds to a direction of travel F. Seen clockwise in the direction of travel F, the internal combustion engine 2 has a total of three cylinder rows 6, 8, 10 which each have six cylinders, with the first cylinder row 6 arranged horizontally, and a second cylinder row 8 and a third cylinder row 10 each being arranged at an angle to the first cylinder row 6 such that the second cylinder row 8 is arranged on the angle bisector between the first and third cylinder rows 6 and 10.

The second and third cylinder rows 8 and 10 are provided symmetrically, in the manner of a V-arrangement, with respect to a vertically running crankshaft plane KE which accommodates a crankshaft 12.

The housing (which is designated 14 overall) of the internal combustion engine 2 is formed essentially from three relatively large components, a crankshaft housing upper part 16 which carries the three cylinder rows 6, 8, 10, a bearing traverse 18 mounted adjacent thereto, and a housing lower part 20, which is in turn adjacent to the bearing traverse 18. The crank housing upper part 16 and the bearing traverse 18 are adjacent to one another in a separation plane TE1, in which the crankshaft 12 and an auxiliary shaft 22 driven by it are mounted such that they can rotate.

A second separation plane TE2 runs parallel to the first separation plane TE1 between the bearing traverse 18 and the housing lower part 20; the two separation planes TE1, TE2 are arranged inclined through an angle W with respect to the crankshaft plane KE and the auxiliary shaft plane NE.

The auxiliary shaft 22 runs in the auxiliary shaft plane NE which is arranged parallel to and at a distance A from the crankshaft plane KE and is identical to a vehicle longitudinal center plane.

The auxiliary shaft 22 is driven in a manner which is not shown within the housing 14 by the crankshaft 12, and is used to transmit power to the transmission 4. Located at the rear in the direction of travel F, the transmission 4 has a distributor transmission 24 which, in a manner which will be explained further below, optionally drives rear wheels of the vehicle via an output drive and, via an output drive shaft 26 routed at the front, and in a manner which is still to be described, drives steerable wheels 28 and 30 which are arranged at the side alongside the drive unit.

Opening 34 which has a center point MP is provided on a rear wall 32 of the internal combustion engine 2, located at the rear in the direction of travel F of the vehicle, on which opening 34 the output drive shaft 26 is articulated in a manner which is not shown in any more detail.

The crankshaft plane KE runs on a side S1 of the auxiliary shaft plane NE that is on the right seen in the direction of travel F, while the center point MP is located to the right of this crankshaft plane KE, once again seen in the direction of travel F.

The output drive shaft 26, which is connected to the opening 34, runs rising in the direction of travel F from the distributor transmission 24 and, in the housing lower part 20, drives a short shaft 36 which is mounted and supported there. This shaft 36 drives a branch 40, which is in the form of a differential 38. A pot-like depression 42 is arranged recessed integrally in the housing lower part 20 in order to accommodate this differential 38. On the output drive side, an input drive shaft 44 which leads to the right-hand wheel 30 and an intermediate shaft 48, which leads to an input drive shaft 46 for the left-hand wheel 28, are arranged directly adjacent to the differential 38, seen in the direction of travel F. This intermediate shaft 48 is mounted in the depression 42 at the differential end and its longitudinal axis D extends through a bearing neck 50, formed integrally with the bearing traverse 18, with its longitudinal axis D passing through the separation planes TE1 and TE2. On the output side of this bearing neck 50, the input drive shaft 46 is connected and transmits the drive power to the wheel 28, with both input drive shafts 44, 46 being articulated in the region of the wheel axles 52, 54.

In a plan view of the vehicle, both input drive shafts 44, 46 are positioned angled to the rear with respect to the direction of travel F, that is to say an angle $\alpha$ between the vehicle longitudinal center plane or the auxiliary shaft plane NE and the input drive shafts 44, 46 is less than 90 degrees.

In a view of the vehicle from the front, both input drive shafts 44, 46 are arranged so as to be inclined upward, that is to say with an angle $\beta$ between the vehicle longitudinal outer plane or the auxiliary shaft plane NE and the input drive shafts 44, 46 that is less than 90 degrees.

As already mentioned initially in the description of the figures, the distributor transmission 24 may have a further output drive in the form of a universally jointed shaft 56, which leads to a rear axle differential 58 from where it drives the rear wheels via universally jointed shafts 60, 62.

A passage 72 for a steering linkage 74 is provided in the housing lower part 20 between the end wall 32 and the depression 42 for the differential 38. This passage 72 is operated from a steering wheel 78 with the interposition of the steering column 76 and transmits the rotary movements from the steering wheel 78 by means of a track rods 80 to the driven wheels 28 and 30.

The relationships are particularly space-saving and advantageous for installation if the angle W13 between the first cylinder center plane ZME1 and the third cylinder center plane ZME3 is 120 degrees, as a consequence of which the cylinder center plane ZME2, which is arranged on the angle bisector, respectively forms an angle W12 or W23 of 60 degrees to the adjacent cylinder center planes ZME1 and ZME3. Values of between 25 degrees and 35 degrees are advantageous in terms of installation space for the angle W, preferably between 30 and 35 degrees, and in particular 33 degrees. W13 is 120 degrees, as a consequence of which the cylinder center plane 2, which is arranged on the angle bisector, respectively forms an angle W12 or W23 of 60 degrees to the adjacent cylinder center planes ZME1 and ZME3. Values of between 25 degrees and 35 degrees are advantageous in terms of installation space for the angle W, preferably between 30 and 35 degrees, and in particular 33 degrees.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An installation arrangement for a vehicle drive unit, comprising:

an internal combustion engine, the internal combustion engine having cylinders arranged in at least two cylinder rows at an angle to one another, one of the cylinder rows being arranged to lie at least substantially horizontally;

a transmission;

an engine housing;

a crankshaft mounted in the engine housing so as to lie in a longitudinal direction of the vehicle;

a parallel auxiliary shaft driven by the crankshaft for transmitting power to the transmission;

input drive shafts for vehicle wheels; and an output driveshaft in operative connection with the transmission and the input drive shafts for driving the vehicle wheels, the crankshaft and the auxiliary shaft each being arranged in accommodating, vertically running planes at a distance from one another so that an auxiliary shaft plane (NE) which accommodates the auxiliary shaft is identical to a vehicle longitudinal center plane, and a crankshaft plane (KE) which accommodates the crankshaft is arranged offset at a distance from the auxiliary shaft plane to one side, the output drive shaft of the transmission being effectively connected to a wall of the engine housing.

2. An arrangement as defined in claim 1, wherein the engine housing has a rear wall, relative to a direction of vehicle travel, with an opening therein, the output drive shaft of the transmission being articulated on the rear wall at the opening, the opening having a center point (MP) arranged at a distance to one side of the vehicle longitudinal center plane such that the crankshaft plane (KE) lies between the center point (MP) and the auxiliary shaft plane (NE).

3. An arrangement as defined in claim 2, wherein the housing of the internal combustion engine has at least two separation planes (TE1, TE2), the housing including a crank housing upper part which carries the cylinder rows and a bearing traverse adjoining the crank housing upper part along one of the separation planes (TE1), the crankshaft and the auxiliary shaft being mounted in the one separation plane (TE1), and the bearing traverse and a housing lower part adjoining one another in another of the separation planes (TE2).

4. An arrangement as defined in claim 3, wherein the separation planes (TE1, TE2) are arranged parallel to one another, and incline through an angle (W) with respect to the crankshaft plane (KE) and incline with respect to the crankshaft plane (NE).

5. An arrangement as defined in claim 4, wherein the substantially horizontal cylinder row has a cylinder center plane (ZME1) arranged at right angles to the crankshaft plane (KE), and so as to run parallel and underneath a transmission plane (GE) which accommodates the auxiliary shaft, the center point (MP) of the opening being located underneath the transmission plane (GE).

6. An arrangement as defined in claim 5, wherein the branch is a differential arranged in the housing lower part, and further comprising an intermediate shaft connected between the differential and at least one of the input drive shafts, the intermediate shaft having a longitudinal axis (D) that runs underneath the center point (MP).

7. An arrangement as defined in claim 6, wherein the bearing traverse has a bearing neck, the intermediate shaft being arranged to pass through the bearing traverse within the bearing neck.

8. An arrangement as defined in claim 5, wherein the internal combustion engine has a further cylinder row which is arranged between the cylinder rows that are at an angle to one another.

9. An arrangement as defined in claim 8, wherein the cylinder rows are arranged, as seen clockwise in the direction of travel, with the substantially horizontal cylinder row first, the further cylinder row second, followed by a third cylinder row.

10. An arrangement as defined in claim 9, wherein the second and the third cylinder rows are arranged symmetrically with respect to the crankshaft plane (KE) so as to form a V-engine, the second cylinder row having a cylinder center plane (ZME2) that lies on the angle bisector between the cylinder center plane (ZME1) of the first cylinder row and a cylinder center plane (ZME3) of the third cylinder row.

11. An arrangement as defined in claim 1, wherein the input drive shafts are arranged so that an angle between the input drive shafts and the vehicle longitudinal center plane, in a plan view of the vehicle, is less than 90 degrees.

12. An arrangement as defined in claim 11, wherein, in a view from in front of the vehicle, an angle enclosed between the input drive shafts and the vehicle longitudinal center plane is less than 90 degrees.

* * * * *